(12) United States Patent
Chen et al.

(10) Patent No.: US 7,834,971 B2
(45) Date of Patent: Nov. 16, 2010

(54) MULTI-DOMAIN VERTICAL ALIGNMENT LIQUID CRYSTAL DISPLAY HAVING TWO SUB-PIXEL REGIONS

(75) Inventors: Chien-Cheng Chen, Miao-Li (TW);
Yu-Cheng Lin, Miao-Li (TW);
Wen-Ming Hung, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 263 days.

(21) Appl. No.: 12/286,319

(22) Filed: Sep. 29, 2008

(65) Prior Publication Data
US 2009/0086147 A1    Apr. 2, 2009

(30) Foreign Application Priority Data
Sep. 28, 2007    (CN)    .................... 2007 1 0123702

(51) Int. Cl.
*G02F 1/1345*    (2006.01)
*G02F 1/1343*    (2006.01)
(52) U.S. Cl. ........................ 349/144; 349/139
(58) Field of Classification Search ................ 349/144
See application file for complete search history.

(56) References Cited

U.S. PATENT DOCUMENTS

| 7,016,001 | B2 | | 3/2006 | Tanaka et al. | |
|---|---|---|---|---|---|
| 7,084,942 | B2 | * | 8/2006 | Luo | 349/114 |
| 7,283,192 | B2 | * | 10/2007 | Shimoshikiryo | 349/144 |
| 7,301,597 | B2 | * | 11/2007 | Jeong et al. | 349/144 |
| 7,538,846 | B2 | * | 5/2009 | Yoshida et al. | 349/147 |
| 7,557,886 | B2 | * | 7/2009 | Lee et al. | 349/141 |
| 7,633,575 | B2 | * | 12/2009 | Chen et al. | 349/46 |
| 7,755,710 | B2 | * | 7/2010 | Wang et al. | 349/48 |
| 7,764,349 | B2 | * | 7/2010 | Seo et al. | 349/141 |
| 2002/0176030 | A1 | | 11/2002 | Matsumoto | |
| 2005/0213015 | A1 | * | 9/2005 | Shimoshikiryo | 349/144 |
| 2007/0236620 | A1 | * | 10/2007 | Yan | 349/33 |
| 2008/0259234 | A1 | * | 10/2008 | Lin et al. | 349/38 |
| 2009/0091678 | A1 | * | 4/2009 | Jeong et al. | 349/46 |
| 2009/0195489 | A1 | * | 8/2009 | Hung et al. | 345/92 |

FOREIGN PATENT DOCUMENTS

CN    1719321 A    1/2006

* cited by examiner

*Primary Examiner*—Rhonda S Peace
(74) *Attorney, Agent, or Firm*—Wei Te Chung (57) ABSTRACT

An exemplary liquid crystal display includes a first substrate; a second substrate opposite the first substrate; a liquid crystal layer interposed between the first and second substrates; a plurality of pixel electrodes disposed at the second substrate; a plurality of parallel first data lines alternately disposed at the second substrate; a plurality of parallel second data lines alternately disposed at the second substrate. Each of the first data lines is disposed upon and insulative to a corresponding second data line, and each of the first and second data lines provides signals to a corresponding pixel electrode.

11 Claims, 7 Drawing Sheets

MULTI-DOMAIN VERTICAL ALIGNMENT LIQUID CRYSTAL DISPLAY HAVING TWO SUB-PIXEL REGIONS

FIELD OF THE INVENTION

The present invention relates to liquid crystal display (LCD), and more particularly to a multi-domain vertical alignment (MVA) LCD having two different sub-pixel regions in each pixel region thereof.

BACKGROUND OF THE INVENTION

Since liquid crystal displays are thin and light, consume relatively little electrical power, and do not cause flickering like in cathode ray tube (CRT) displays, they have helped spawn product markets such as laptop personal computers. In recent years, there has also been great demand for liquid crystal displays to be used as computer monitors and even televisions, both of which are larger than the liquid crystal displays of laptop personal computers. Such large-sized liquid crystal displays in particular require that an even brightness and contrast ratio prevail over the entire display surface, regardless of observation angle.

Because the conventional twisted nematic (TN) mode liquid crystal display cannot easily satisfy these demands, a variety of improved liquid crystal displays have recently been developed. They include in-plane switching (IPS) mode liquid crystal displays, optical compensation TN mode liquid crystal displays, and multi-domain vertical alignment (MVA) mode liquid crystal displays. In multi-domain vertical alignment mode liquid crystal displays, each pixel is divided into multiple regions. Liquid crystal molecules of the pixel are vertically aligned when no voltage is applied, and are inclined in different directions when a voltage is applied.

Figure 9:
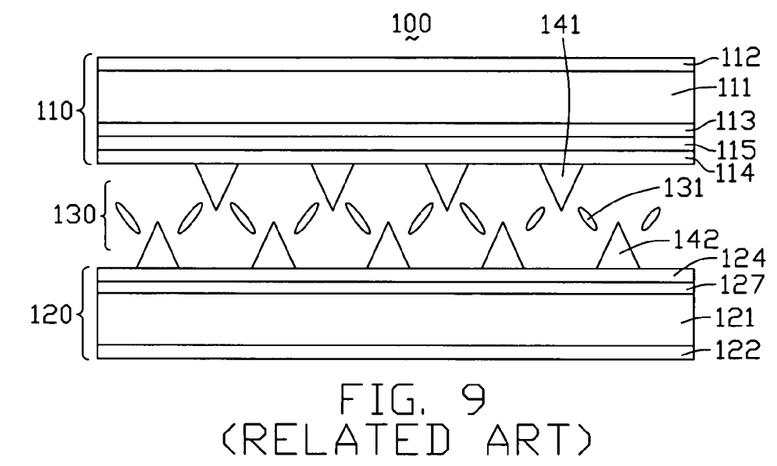
FIG. 9 is a side isometric view of a conventional LCD device.

Referring to FIG. 9, a typical multi-domain vertical alignment liquid crystal display (LCD) 100 includes a first substrate 110, a second substrate 120 parallel to the first substrate 110, and a liquid crystal layer 130 sandwiched therebetween. The liquid crystal layer 130 includes a number of liquid crystal molecules 130 having negative dielectric anisotropy.

Figure 5:
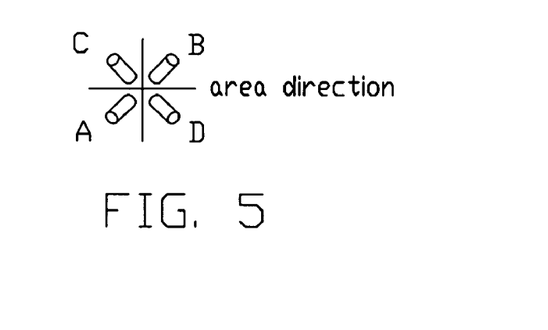
FIG. 5 is a top-down view of orientations of four of the liquid crystal molecules of FIG. 2, according to the corresponding first protrusions and second protrusions at the pixel regions

The first substrate 110 assembly includes an upper polarizer 112, a first transparent substrate 111, a color filter 113, a common electrode 115, and a first alignment film 114 arranged in that order from top to bottom. The first substrate 110 further includes a number of first protrusions 141. Referring also to FIG. 5, the first protrusions 141 are arranged at an inner surface of the first alignment film 114 along generally V-shaped paths. The color filter 113 includes a number a red filters (not shown), a number of blue filters (not shown), and a number of green filters (not shown) sequentially arranged in that order.

The second substrate 120 assembly includes a lower polarizer 122, a second transparent substrate 121, a number of pixel electrodes 127, and a second alignment film 124 arranged in that order from bottom to top. The second substrate 120 further includes a number of second protrusions 142. The second protrusions 142 are arranged at an inner surface of the second alignment film 124 along generally V-shaped paths. The first protrusions 141 and the second protrusions 142 are arranged alternately.

Figure 10:
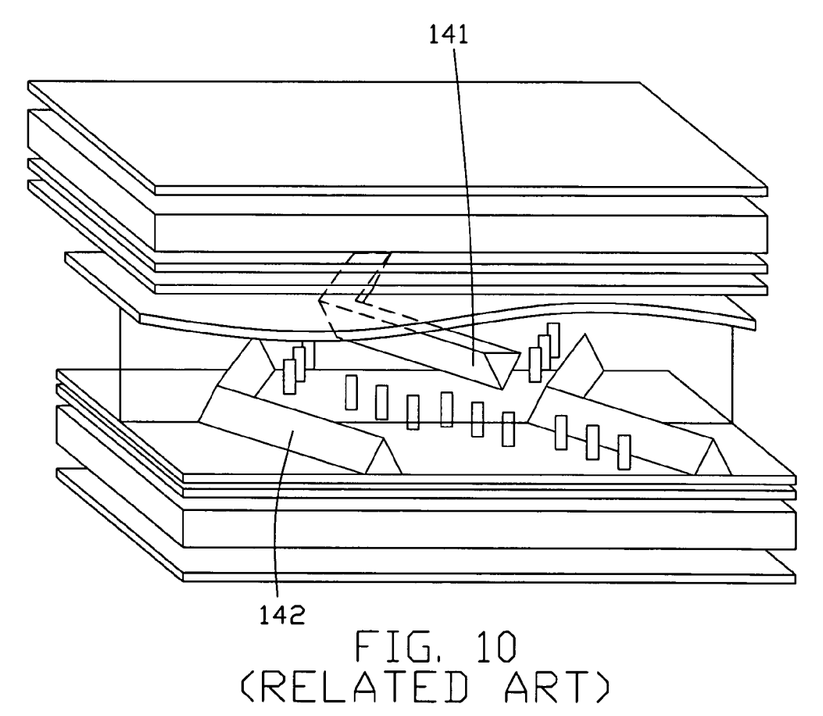
FIG. 10 is an exploded, isometric view of the LCD device in an off state of FIG. 9.

Referring to FIG. 10, when the LCD 6 is in an off state, the liquid crystal molecules 131 are oriented perpendicular to the first substrate 110. In operation during the off state, incident light beams become linearly-polarized light beams after passing through the lower polarizer 122. Because the light beams transmit along the long axes of the liquid crystal molecules 131, after the linearly-polarized light beams pass through the liquid crystal layer 130, the polarizing directions of the linearly-polarized light beams remain unchanged. Thus the linearly-polarized light beams cannot pass though the upper polarizer 112, which has a polarizing axis perpendicular to that of the lower polarizer 122. As a result, the LCD 100 displays a black image.

Figure 11:
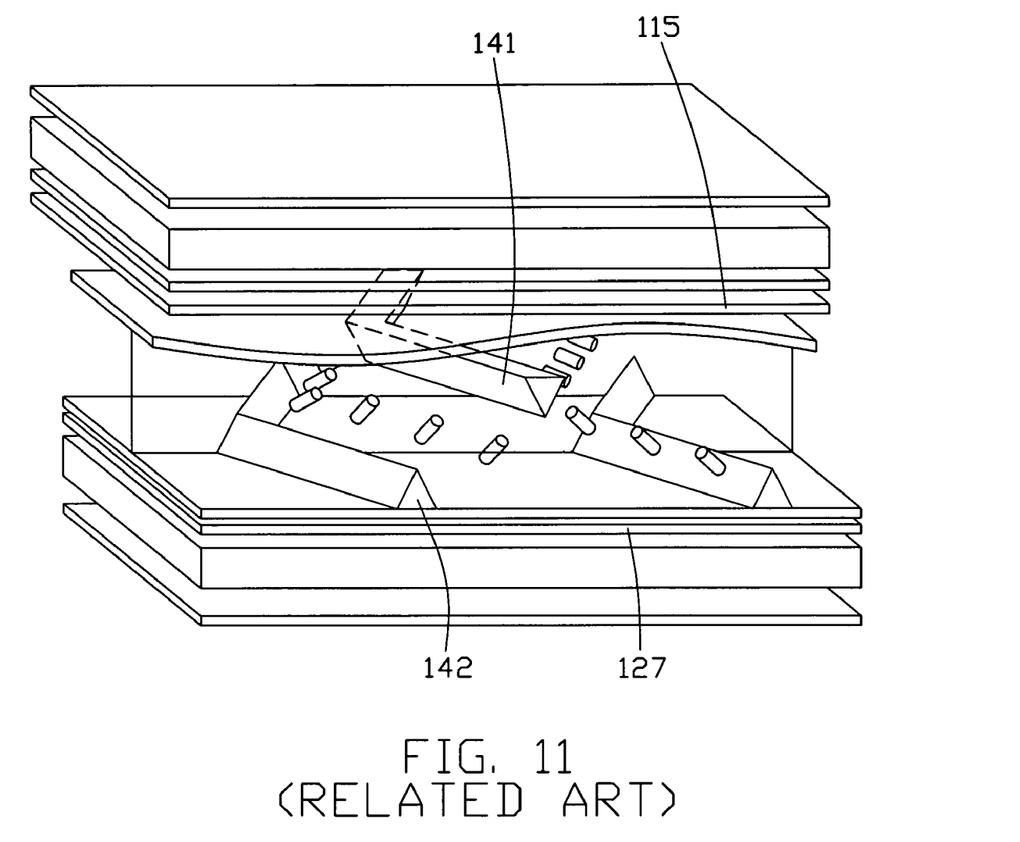
FIG. 11 is an exploded, isometric view of the LCD device in an on state of FIG. 9.
Figure 12:
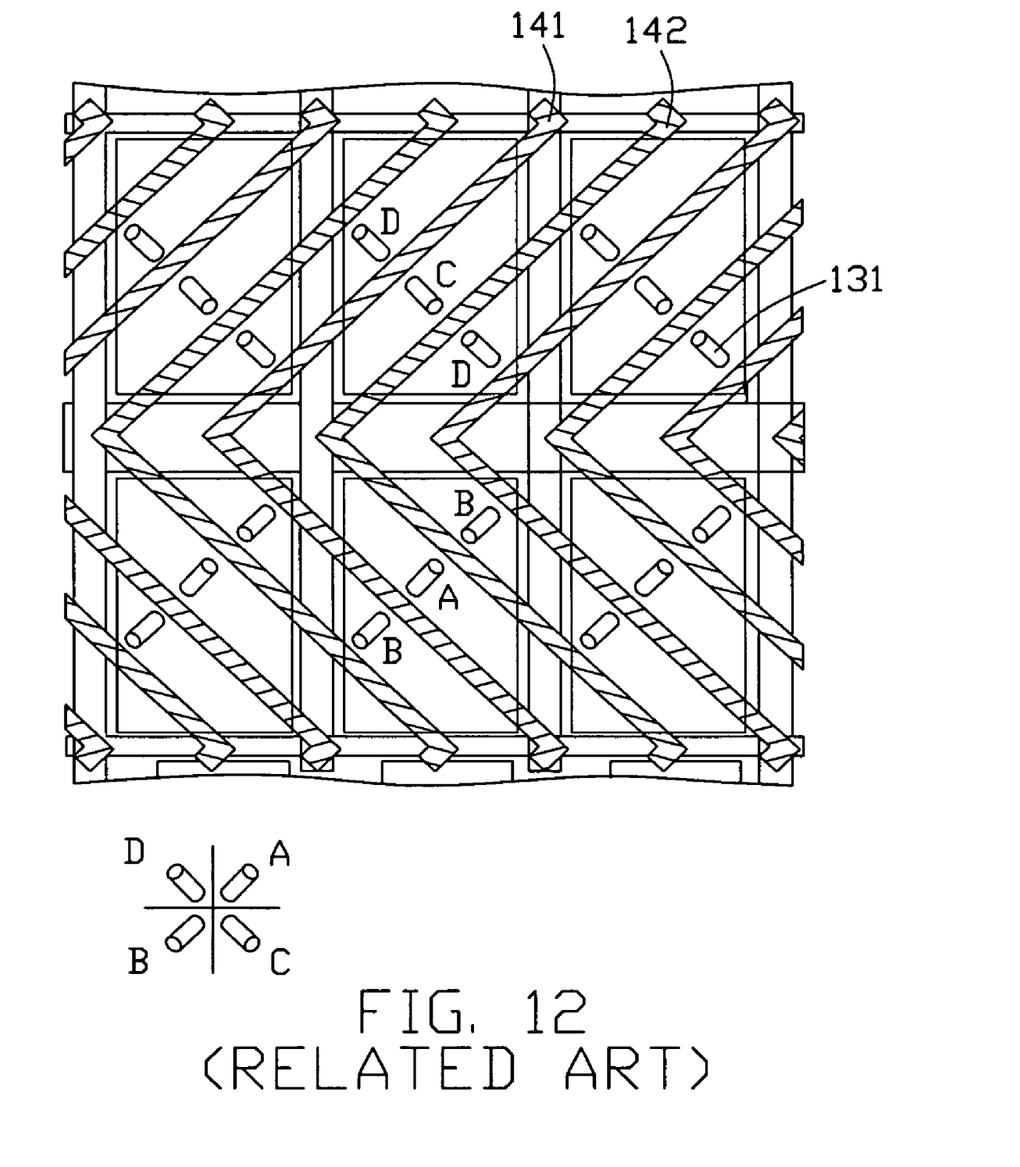
FIG. 12 is a top-down view of orientations of the liquid crystal molecules of FIG. 9.

Referring to FIG. 11, when the LCD 100 is in an on state, voltages are applied thereto, and voltage differences between the common electrode 115 and pixel electrodes 127 generate electric fields perpendicular to the first and second substrates 110, 120. Because the liquid crystal molecules 131 have negative dielectric anisotropy, they are inclined to become oriented parallel to the first substrate 110. Further, the protrusions 141, 142 affect the orientations of the liquid crystal molecules 131, such that the liquid crystal molecules 131 form inclined alignments perpendicular to the slopes of the protrusions 141, 142. Referring also to FIG. 12, the liquid crystal molecules 131 orient in four directions A, B, C and D.

In operation during the on state, incident light beams become linearly-polarized light beams after passing through the lower polarizer 122. Because of birefringence of the liquid crystal molecules 131 and the electric fields, the polarizing directions of the linearly-polarized light beams change to align with the polarizing axis of the upper polarizer 112 after passing through the liquid crystal layer 130. Accordingly, part of the light beams pass through the upper polarizer 112. Therefore, the LCD 100 displays an image with desired brightness.

Because the liquid crystal molecules 131 are oriented in four directions A, B, C and D, color shift that would otherwise be manifest in images displayed by the LCD 100 is compensated. In particular, the LCD 100 has a more even display performance along four different viewing directions corresponding to the directions A, B, C and D. That is, the LCD 100 attains a display having four domains.

However, the four-domain configuration can only compensate visual performance in four directions.

What is needed, therefore, is a multi-domain vertical alignment LCD having more domains that can provide a uniform display in more viewing directions.

SUMMARY

An exemplary liquid crystal display includes a first substrate; a second substrate opposite the first substrate; a liquid crystal layer interposed between the first and second substrates; a plurality of pixel electrodes disposed at the second substrate; a plurality of parallel first data lines alternately disposed at the second substrate; a plurality of parallel second data lines alternately disposed at the second substrate. Each of the first data lines is disposed upon and insulative to a corresponding second data line, and each of the first and second data lines provides signals to a corresponding pixel electrode.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
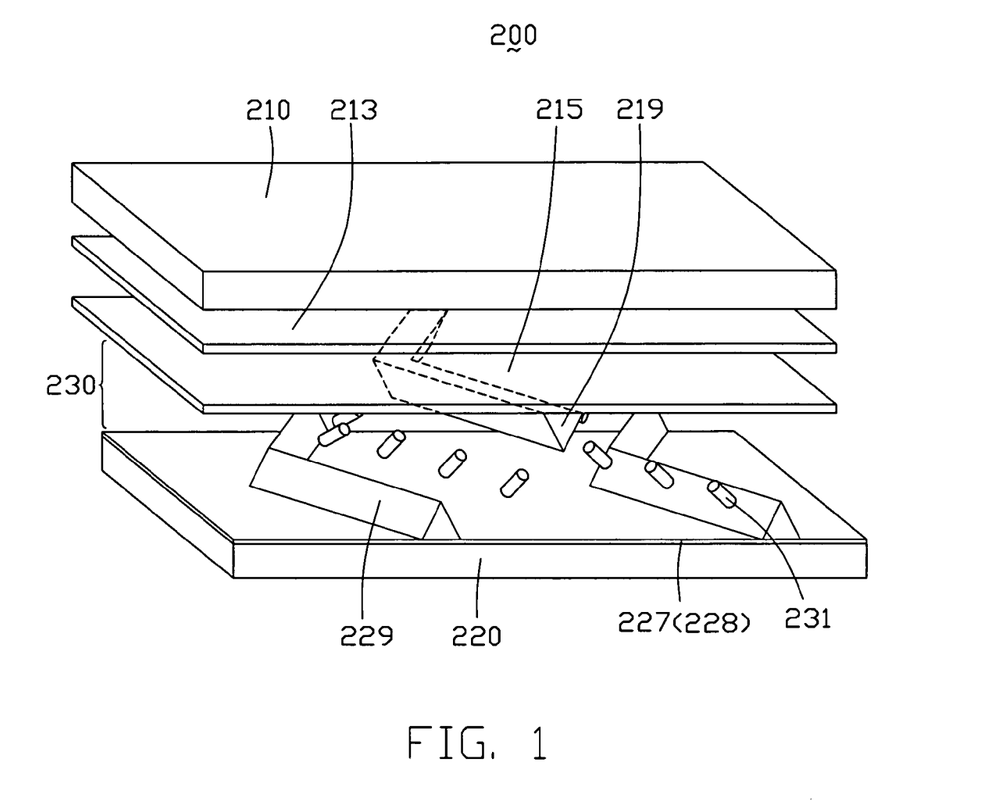
FIG. 1 is an exploded, isometric view of an LCD device according to a first embodiment of the present invention, the LCD device including a plurality of first protrusions, a plurality of second protrusions, and a plurality of pixel regions.
Figure 2:
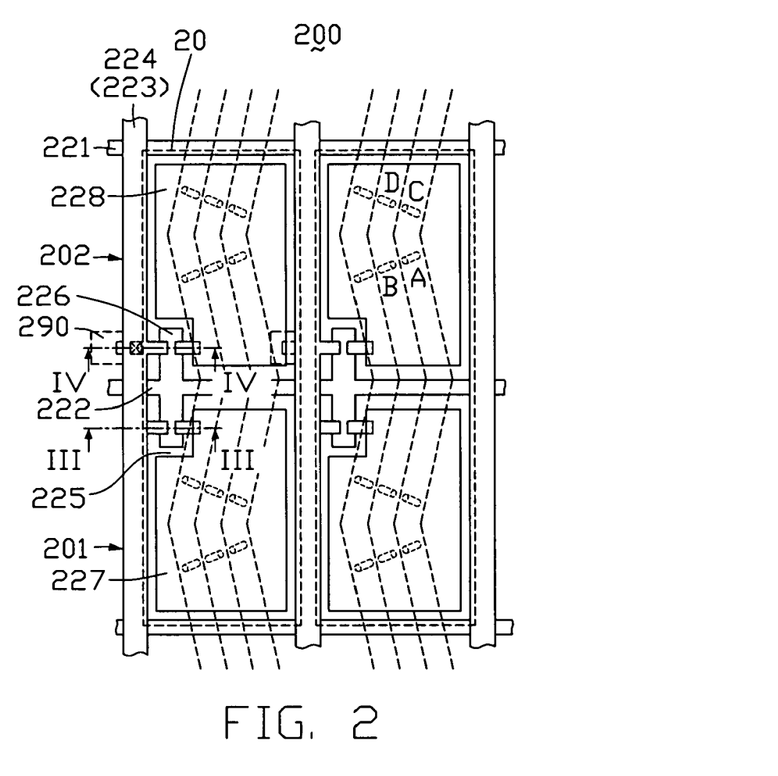
FIG. 2 is a top plan view of pixel regions of the LCD device of FIG. 1.

Referring to FIG. 1 and FIG. 2, an MVA-type LCD device 200 according to a first embodiment of the present invention includes a first substrate assembly 210, a second substrate assembly 220 parallel to the first substrate assembly 210, and a liquid crystal layer 230 sandwiched between the two substrate assemblies 210, 220. The liquid crystal layer 230 includes a plurality of liquid crystal molecules 231.

The first substrate assembly 210 includes a color filter 213, a common electrode 215, and a plurality of first protrusions 219 arranged in that order from top to bottom. The color filter 213 includes a plurality of red filter units (not shown), a plurality of green filter units (not shown), and a plurality of blue filter units (not shown). The first protrusions 219 each have a triangular section configuration, and are arranged along a plurality of V-shaped paths.

The second substrate assembly 120 includes a plurality of parallel common lines 221, a plurality of parallel scan lines 222, a plurality of first data lines 223, a plurality of second data lines 224 parallel to the first data lines 223, a plurality of first thin film transistors 225, a plurality of second thin film transistors 226, a plurality of first pixel electrodes 227, a plurality of second pixel electrodes 228, and a plurality of protrusions 229.

The common lines 221 and the scan lines 222 are alternately disposed and that are parallel to each other and that each extend parallel to a first direction. The first data lines 223 that are parallel to each other and that each extend parallel to a second direction that is orthogonal to the first direction. The second lines 224 are disposed upon and insulative to the first data lines 223.

Every two adjacent first data lines 223 together with every two adjacent common lines 221 form a rectangular area defined as a pixel region 20. Each pixel region 20 corresponds to a filter unit, and is divided into a first sub-pixel unit 201 and a second sub-pixel unit 202.

The first pixel electrodes 227 are disposed in the first sub-pixel units 201. The second pixel electrodes 228 are disposed in the second sub-pixel units 202. The first TFTs 225 are located in the vicinity of intersections of the scan lines 222 and the first data lines 223, respectively. Each first TFT 225 includes a source electrode (not labeled) connected to the corresponding first data line 223, a gate electrode (not labeled) connected to the corresponding gate line 222, and a drain electrode (not labeled) connected to the corresponding first pixel electrode 227. Each second TFT 226 is located in the vicinity of intersections of the scan lines 222 and the second data lines 224. Each second TFT 226 includes a gate electrode (not labeled) connected to the same scan line 222 that the corresponding first TFT 225 is connected to, and a drain electrode (not labeled) connected to the second pixel electrode 228.

The first data line 223 includes a bent portion 290 corresponding to the second TFT 226. The second data line 224 is coupled to the source electrode of the second TFT 226 via a through hole (not labeled) corresponding to the bent portion 290. Each of the second protrusions 229 has a triangular section configuration, and is arranged along a plurality of V-shaped paths. The first and second protrusions 219, 229 are alternately disposed.

Figure 3:
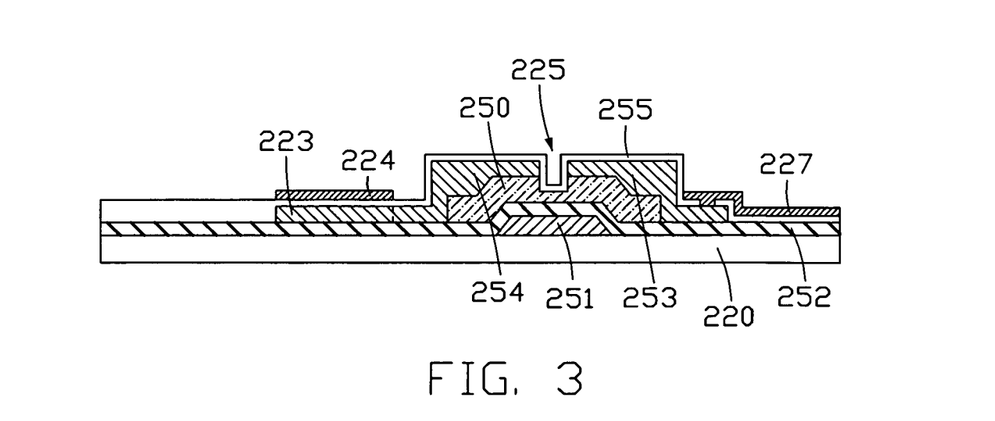
FIG. 3 is a cross-sectional view taken along line III-III of FIG. 2.
Figure 4:
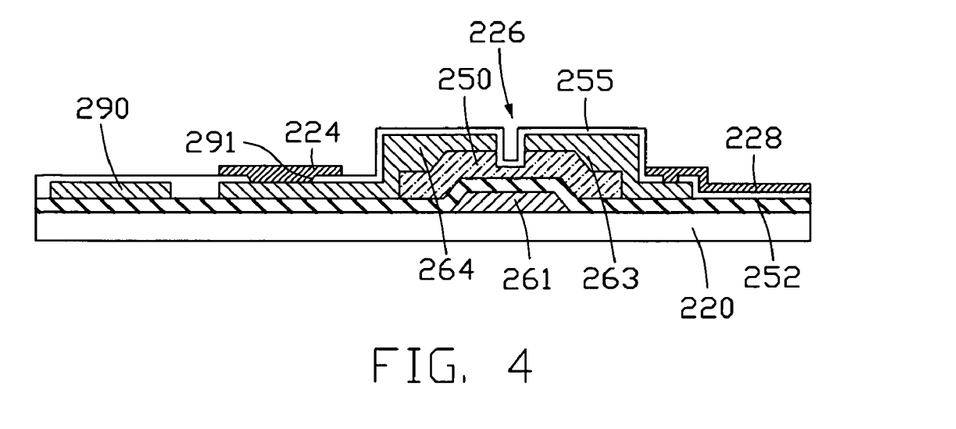
FIG. 4 is a cross-sectional view taken along line IV-IV of FIG. 2.

Also referring to FIGS. 3-4, the LCD device 200 further includes a gate insulating layer 252, a semiconductor layer 250, a passivation layer 255. Gate electrodes 251, 261 of the first and second TFTs 225, 226 and the scan lines 222 are disposed on the second substrate 220, and the semiconductor layer 250 covers the gate electrodes 251, 261 and the scan lines 222. The drain electrodes 253, 263 and the source electrodes 254, 264 are disposed on the semiconductor layer 250 and gate insulating layer 252. The first data line 223 is disposed on the gate insulating layer 252, the passivation layer 255 covers the first data lines 223, the gate insulating layer 252, drain electrodes 253, 263 and source electrodes 254, 264. The second data lines 224, the pixel electrodes 227, 228 are disposed on the passivation layer 255. The passivation layer 255 includes a through hole 291 corresponding to the bent portion 290 of the first data line 223.

Figure 6:
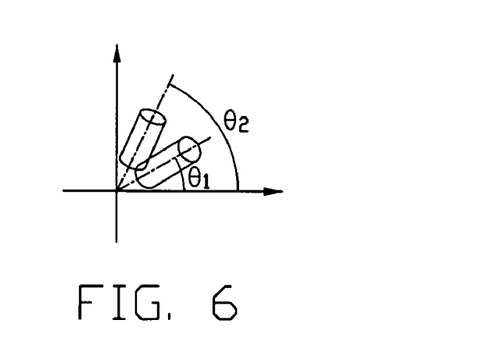
FIG. 6 is a schematic, side view of orientations of two of the liquid crystal molecules of FIG. 2, the liquid crystal molecules having different tilt angles.

With theses configurations, a first gray scale voltage may be provided to the first pixel electrode 227 via the first data line 223 and the first TFT 225. A second gray scale voltage may be provided to the second pixel electrode 228 via the second data line 224 and the second TFT 226. Also referring to FIGS. 5-6, when corresponding voltages are applied to the first pixel electrode 227 and the common electrode 215, an electric field is generated therebetween. The liquid crystal molecules 131 twist according to the electric field. The liquid crystal molecules 231 are guided by the protrusions 219, 229 and thereby become aligned in four different directions A, B, C, D. Thus four domains are defined according to the protrusions 219, 229. When corresponding voltages are applied to the second pixel electrode 228 and the common electrode 215, another electric field is generated therebetween. Because the voltages of the first pixel electrodes 227 are different from the voltages of the second pixel electrodes 228 in each frame, tilt angles $\theta_1$ of the liquid crystal molecules 231 in the first sub-pixel units 201 are different from tilt angles $\theta_2$ of the liquid crystal molecules 231 in the second sub-pixel units 202. Thus, a total of eight domains are defined in each pixel unit 20. That is, the LCD device 200 achieves 8-domain vertical alignment.

Unlike with conventional MVA-type LCD devices, the LCD device 200 includes the first data lines 223 and the second data lines 224. The second data lines 224 also function to make the voltages of the first pixel electrodes 227 different from the voltages of the second pixel electrodes 228. Each pixel unit 20 may achieve 8-domain vertical alignment.

Figure 7:
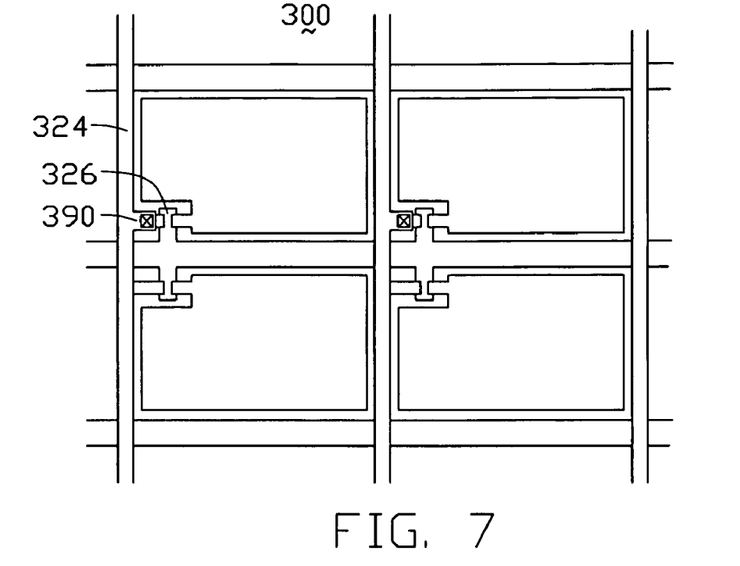
FIG. 7 is a top plan view of pixel regions of the LCD device according to a second embodiment.

Referring to FIG. 7, an LCD device 300 according to a second embodiment of the present invention is similar to the LCD device 200. However, the second data lines 324 includes a bent portion 390 corresponding to the second TFT 326, and the bent portion 390 is coupled to a source electrode of the second TFT 326 via a through hole.

Figure 8:
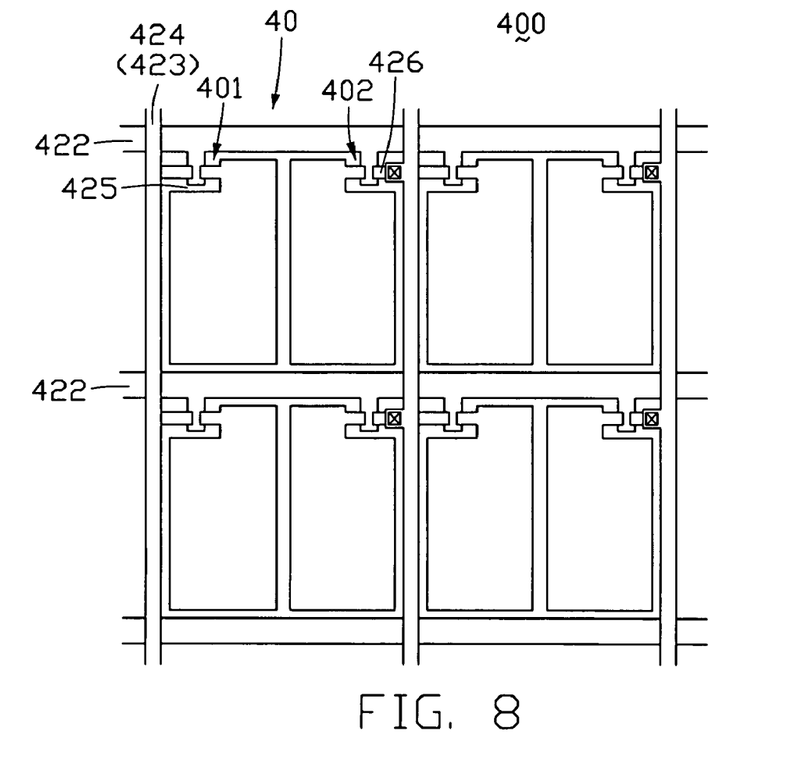
FIG. 8 is a top plan view of pixel regions of the LCD device according to a third embodiment.

Referring to FIG. 8, an LCD device 400 according to a third embodiment of the present invention is similar to the LCD device 200. However, two adjacent data lines 324 cooperatives with two adjacent scan lines to form a pixel region 40. The pixel region 40 is divided into a first sub-pixel region 401 and a second sub-pixel region 402. A source electrode of the first TFT 425 is coupled to the first electrode 423, and a source electrode of the second TFT 426 is coupled to the second electrode 424.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A liquid crystal display, comprising:
   a first substrate;
   a second substrate opposite the first substrate;
   a liquid crystal layer interposed between the first and second substrates;
   a plurality of pixel electrodes disposed at the second substrate;
   a plurality of parallel first data lines alternately disposed at the second substrate;
   a plurality of parallel second data lines alternately disposed at the second substrate;
   wherein each of the first data lines is disposed upon and insulative to a corresponding second data line, and each of the first and second data lines provides signals to a corresponding pixel electrode.

2. The liquid crystal display of claim 1, wherein the first data lines are disposed between the second substrate and the second data lines.

3. The liquid crystal display of claim 2, further comprising a plurality of scan lines disposed at the second substrate and being perpendicular and insulative to the first and second data lines.

4. The liquid crystal display of claim 3, further comprising a plurality of common lines parallel to the scan lines, the common lines and the scan lines are alternately disposed at the second substrate.

5. The liquid crystal display of claim 4, wherein two adjacent first data lines cooperate with two adjacent common lines to define a pixel region, a scan line crosses the pixel region to divide the pixel region into a first sub-pixel region and a second sub-pixel region.

6. The liquid crystal display of claim 5, further comprising a plurality of first thin film transistors and a plurality of second thin film transistors, each first thin film transistor corresponds to a first sub-pixel region, and each second thin film transistor corresponds to a second sub-pixel region.

7. The liquid crystal display of claim 6, wherein, in each pixel region, gate electrodes of the first and second thin film transistors are coupled to a corresponding scan line, a source electrode of the first thin film transistor is coupled to the first data line, and a source electrode of the second thin film transistor is coupled to the second data line.

8. The liquid crystal display of claim 7, wherein the first data line comprises a bent portion corresponding to the second thin film transistor, the second data line is coupled to the source electrode of the second thin film transistor via a through hole corresponding to the bent portion.

9. The liquid crystal display of claim 8, wherein the second data line comprises an extending portion corresponding to the second thin film transistor, the extending portion is coupled to the source electrode of the second thin film transistor via a through hole.

10. The liquid crystal display of claim 9, wherein each pixel electrode comprises a first pixel electrode disposed at the first sub-pixel region and a second pixel electrode disposed at the second sub-pixel region.

11. The liquid crystal display of claim 10, wherein a drain electrode of the first thin film transistor is coupled to the first pixel electrode, and a drain electrode of the second thin film transistor is coupled to the second pixel electrode.

* * * * *